United States Patent

Hachimura

[11] Patent Number: 6,055,416
[45] Date of Patent: Apr. 25, 2000

[54] PREVENTION OF AUDIBLE CONTROL SIGNAL TRANSMISSION

[75] Inventor: Futoshi Hachimura, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/918,007

[22] Filed: Aug. 25, 1997

Related U.S. Application Data

[63] Continuation of application No. 08/428,776, Apr. 24, 1995, abandoned.

[30] Foreign Application Priority Data

Apr. 28, 1994 [JP] Japan ..................................... 6-114030

[51] Int. Cl.[7] ....................................................... H04B 1/00
[52] U.S. Cl. ............................ 455/70; 455/212; 455/218; 455/308
[58] Field of Search ...................................... 455/212, 218, 455/219, 220, 221, 222, 225, 70, 78, 79, 308, 309, 312, 231, 63, 67.3

[56] References Cited

U.S. PATENT DOCUMENTS

| 4,689,812 | 8/1987 | Hata . | |
|---|---|---|---|
| 4,748,685 | 5/1988 | Rozanski | 455/218 |
| 5,060,296 | 10/1991 | Grube et al. | 455/218 |

FOREIGN PATENT DOCUMENTS

| 4-120942 | 4/1992 | Japan . |
|---|---|---|
| 4-261251 | 9/1992 | Japan . |
| 5-236144 | 9/1993 | Japan . |
| 5-347583 | 12/1993 | Japan . |
| 6-85890 | 3/1994 | Japan . |

OTHER PUBLICATIONS

U.S. Patent Application Serial No. 185,228, filed Jan. 24, 1994.
U.S. Patent Applicant Serial No. 191,755, filed Feb. 4, 1994.
U.S. Patent Application Serial No. 147,400, filed Nov. 5, 1993, and its related Application Serial No. 08/533,700, filed Sep. 26, 1995.
U.S. Patent Application Serial No. 918,009, filed Jul. 24, 1992.

*Primary Examiner*—Daniel S. Hunter
*Assistant Examiner*—Darnell R. Armstrong
*Attorney, Agent, or Firm*—Morgan & Finnegan LLP

[57] ABSTRACT

A communication system having a radio master and a radio slave for communicating a communication signal and a control signal via a common channel is constructed by a receiver to receive a communication signal, a transmitter to transmit a control signal, and a limiter to limit an output of the signal received by the receiver for a period of time corresponding to a transmission of the control signal and a reception of a predetermined signal by the receiver. The limiter has a key to request the transmission of the control signal and limits the output of the reception signal in accordance with the key operation. The generation of an uncomfortable sound which is caused by a communication of the control signal can be prevented.

21 Claims, 10 Drawing Sheets

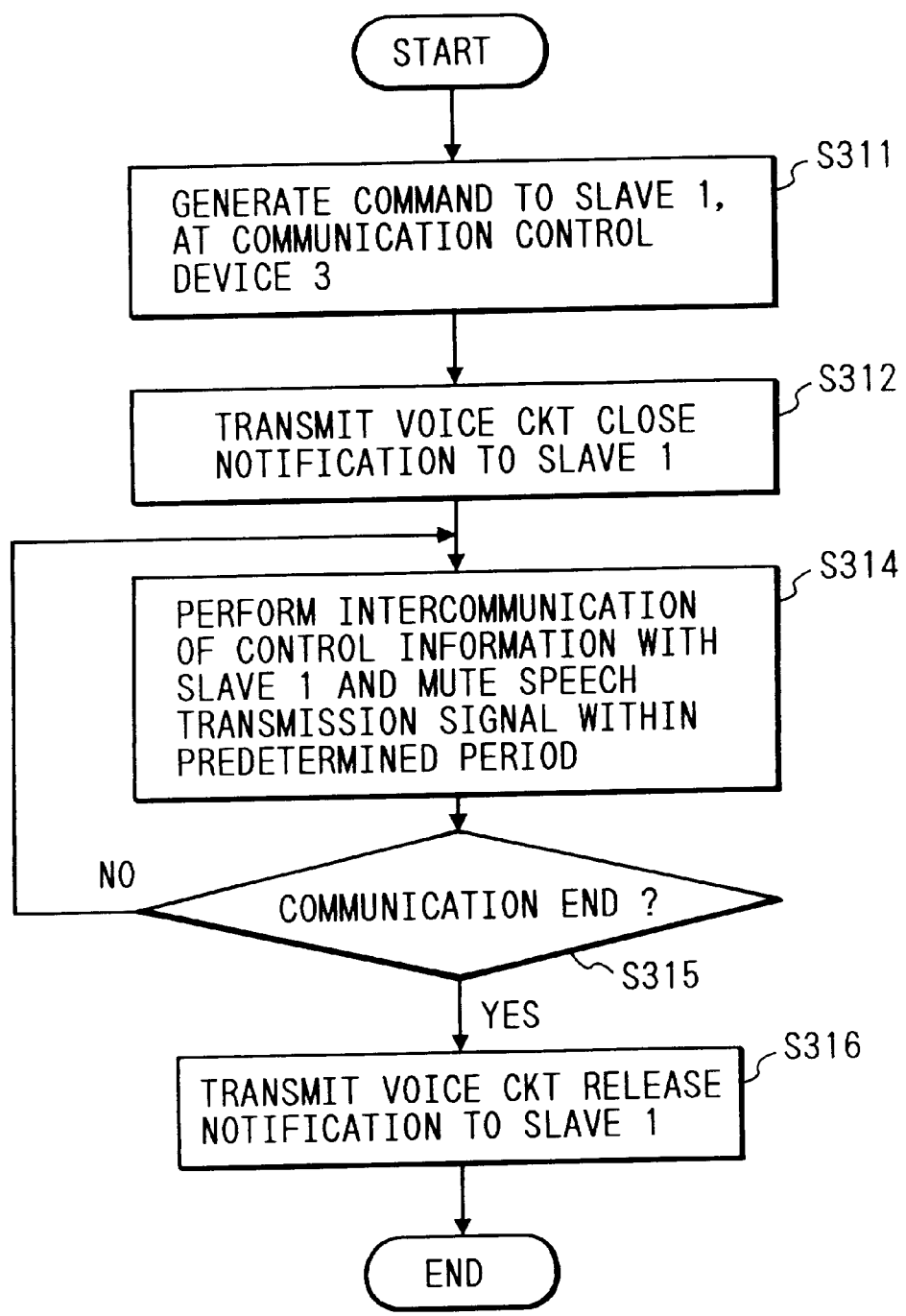

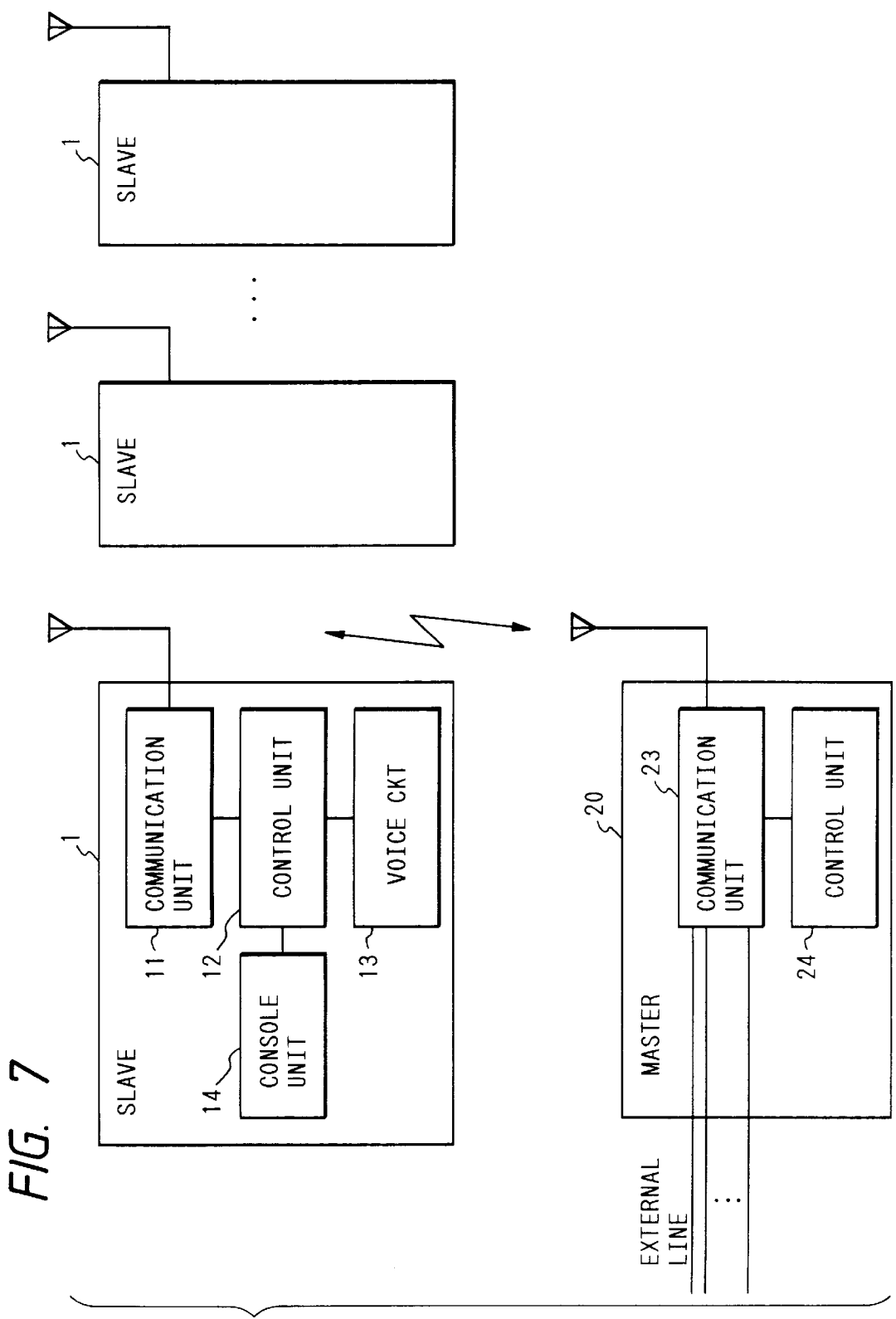

PREVENTION OF AUDIBLE CONTROL SIGNAL TRANSMISSION

This is a continuation of application Ser. No. 08/428,776, filed on Apr. 24, 1995 now abandoned.

BACKGROUND OF THE INVENTION

1. Field of the Invention

The invention relates to a communication system which transmits a communication signal and a control signal through a common channel.

2. Related Background Art

In a radio telephone system, a timer of a predetermined time is provided in order to prevent an uncomfortable sound which is caused due to communication of control information before communication of speech when a key entry operation is performed in a radio slave terminal a voice circuit is closed for the predetermined time.

However, as shown in FIG. 4, in the case where communication of a control signal with a communication control device in association with a key operation in the radio slave takes longer than the predetermined closure time of the voice circuit because, for example, signal transmission is repeated since radio throughout is bad or there is a delay of processes in the communication control device or there are a number of control information, or the like, there is a problem in that an uncomfortable sound which is caused by the communication of the control information with the communication control device is heard from the radio slave.

SUMMARY OF THE INVENTION

It is an object of the invention to prevent audibility of a control signal which is communicated session during a communication.

Another object of the invention is to prevent generation of an uncomfortable sound associated with a control signal when the control signal is communicated during a-speech communication.

Still another object of the invention is to prevent audibility of a control signal transmitted when a signal according to a key operation is transmitted.

Yet another object of the invention is to prevent audibility of a control signal when transmission of the control signal is started from an own system and when transmission of the control signal is started from a communication partner.

A further object of the invention is to provide a communication system in which a countermeasure for noisiness of a reception signal is performed by a slave at a proper timing and a countermeasure for noisiness of a transmission signal is performed by a master at an arbitrary timing.

The above and other objects and features of the present invention will become apparent from the following detailed description and the appended claims with reference to the accompanying drawings.

BRIEF DESCRIPTION OF THE DRAWINGS

FIGS. 6A and 6B are flowcharts showing the second operation of the first embodiment;

FIG. 7 is a block diagram showing the second embodiment of the invention;

DETAILED DESCRIPTION OF THE PREFERRED EMBODIMENTS

An embodiment of the present invention will now be described in detail hereinbelow with reference to the drawings.

Figure 1:
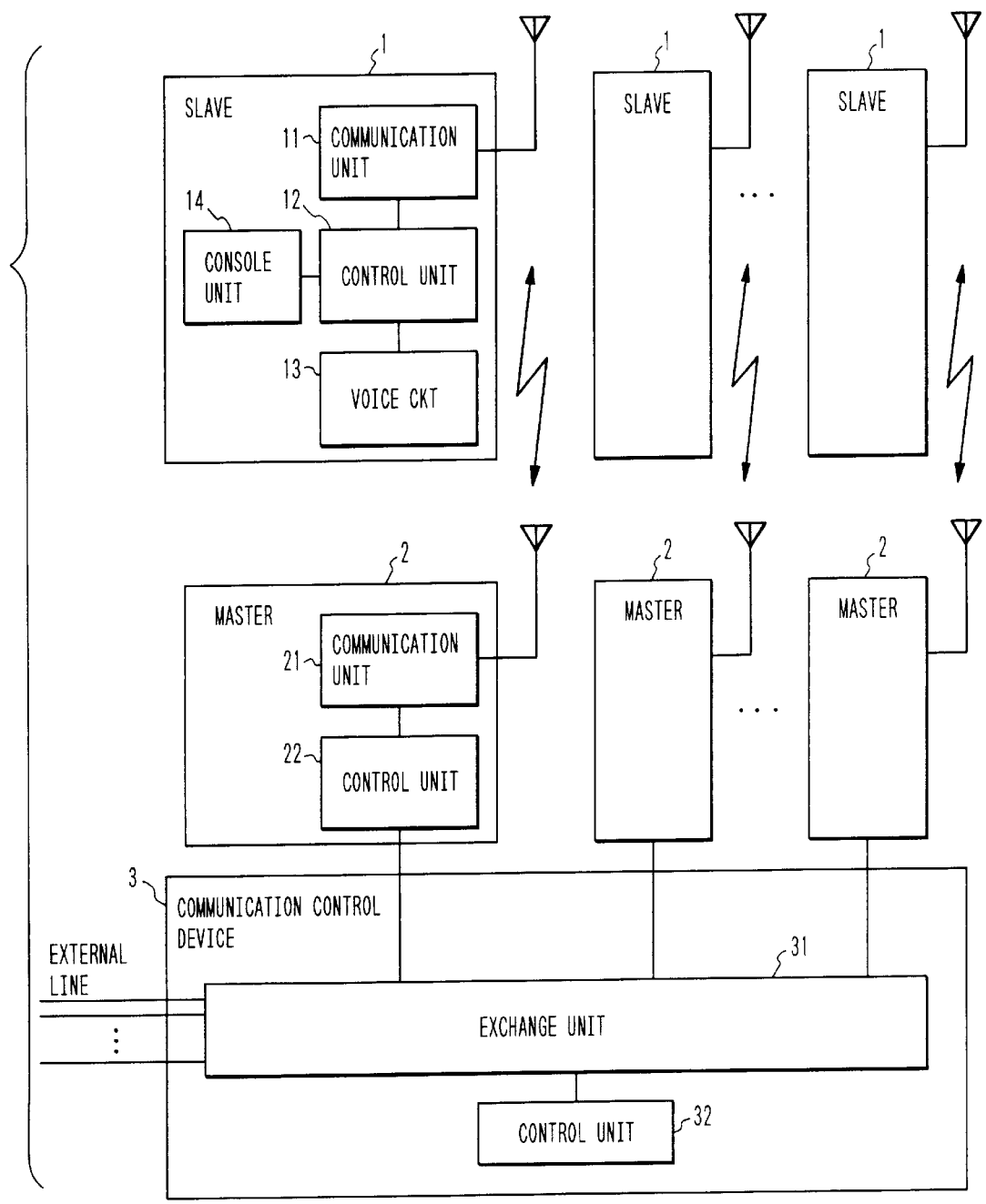
FIG. 1 is a block diagram showing the first embodiment of the invention.

FIG. 1 is a block diagram showing an example of a first radio telephone system embodying the invention. The system comprises: a cordless slave (hereinafter, referred to as a slave) 1 as a radio slave; a cordless master (hereinafter, referred to as a master) 2 as a radio master; and a communication control device 3 to control a telephone line. The slave 1 has a communication unit 11, a control unit 12, a voice circuit 13, and a console unit 14. The voice circuit 13 includes a handset, a speaker, and the like. The master 2 has a communication unit 21 and a control unit 22. The communication control device 3 has an exchange unit 31 and a control unit 32.

Figure 2:
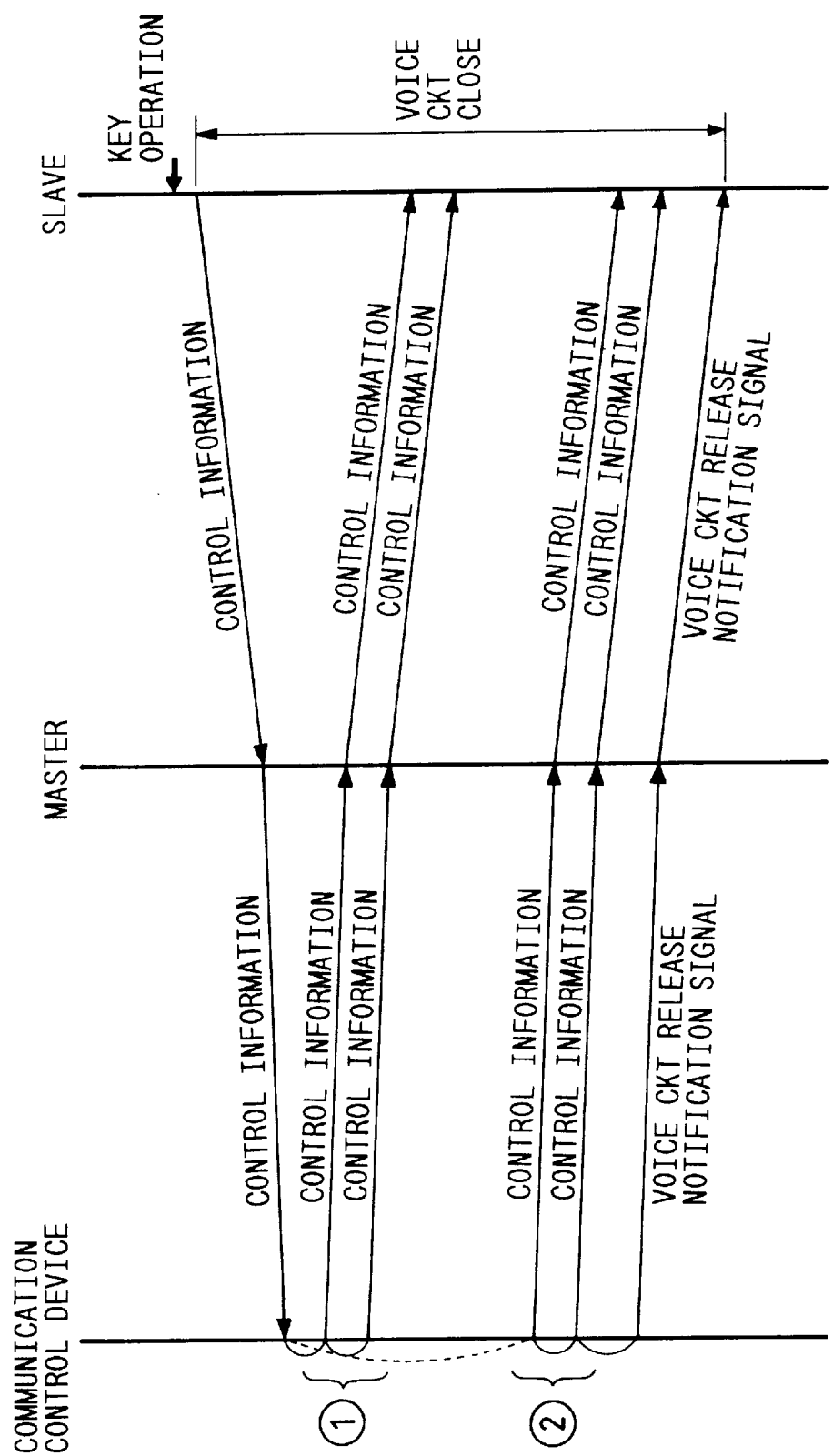
FIG. 2 is a sequence chart showing the first operation of the first embodiment.
Figure 3A:
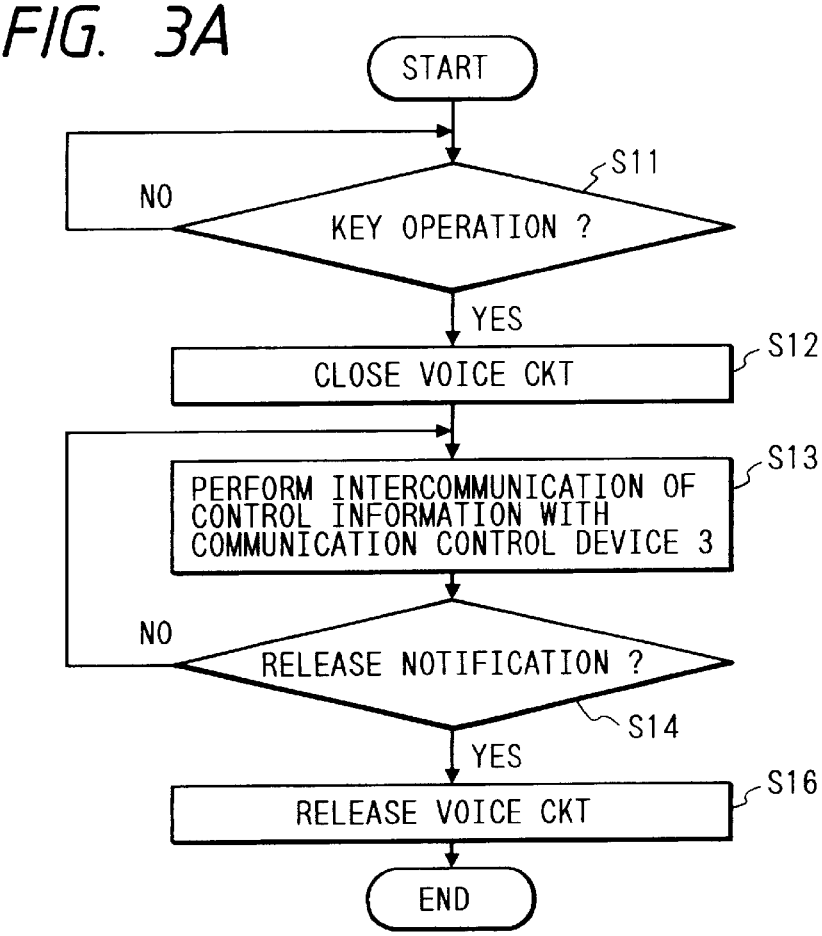
FIGS. 3A and 3B are flowcharts showing the first operation of the first embodiment.
Figure 3B:
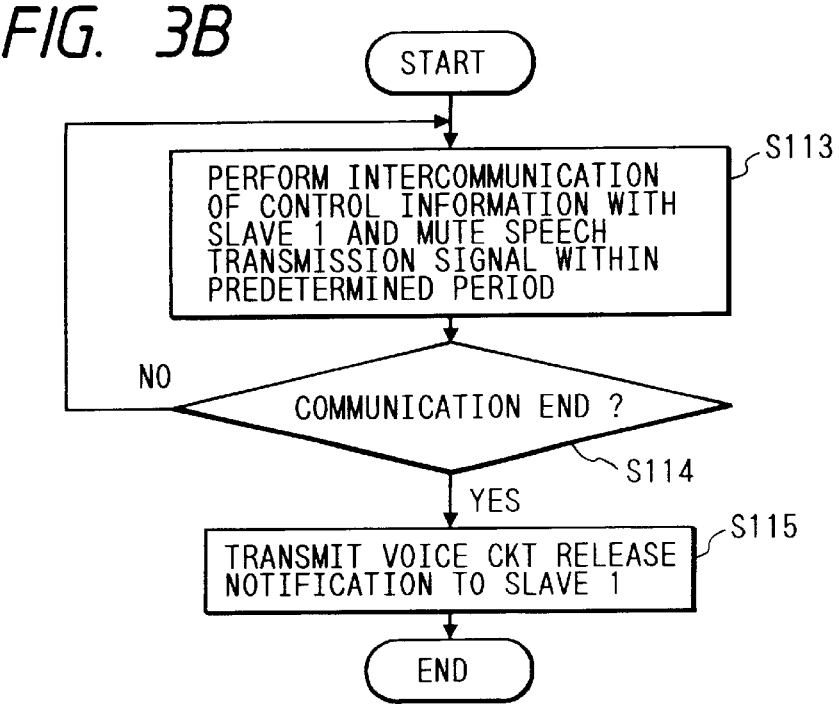
Figure 4:
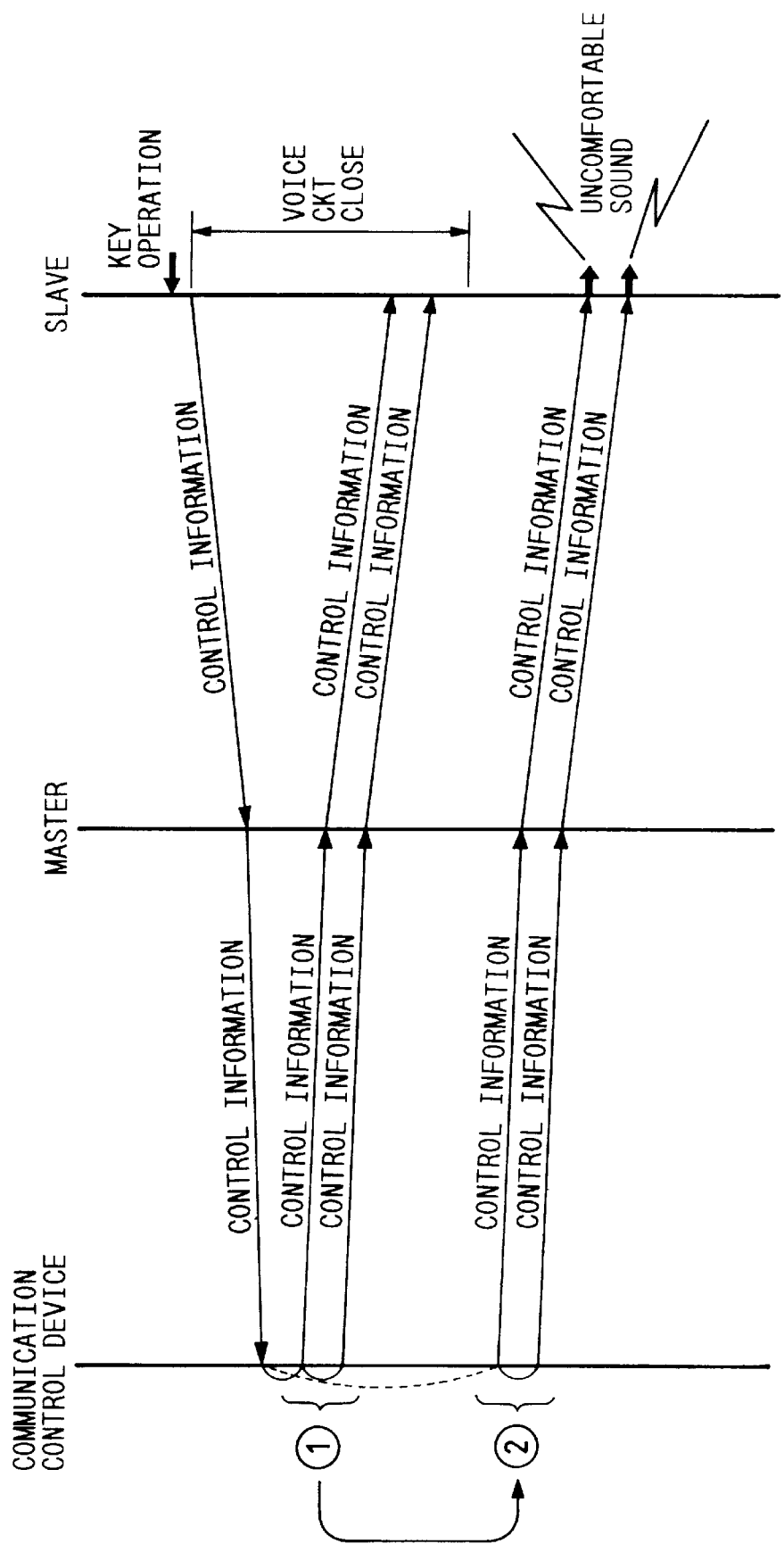
FIG. 4 is a sequence chart showing the operation of a conventional system.

FIG. 2 is a sequence chart showing an example of the operation of the radio telephone system of the embodiment. FIGS. 3A and 3B are flowcharts showing an example of the operation of the slave 1 and communication control device 3 of the radio telephone system of the embodiment.

For example, in the case where a holding key is depressed in the slave 1, control information regarding a display and control information regarding a state (during speech communication, during holding) are transmitted to the slave 1.

First, when a key operation such as a dial key or the like is performed in the console unit 14 of the slave 1 (S11), in order to prevent a user from hearing an uncomfortable sound due to the control information communication the control unit 12 closes the voice circuit 13 (on the speech reception side) of the slave 1 while using the key operation as a trigger (S12). It is not always necessary to completely turn off a speech reception output but to reduce a volume sufficiently.

Although the slave 1 and communication control device 3 execute the communication of the control information according to the key operation via the master 2, an uncomfortable sound in association with such a communication is not heard by the user (S13, S113). In this instance, since the control information in association with the key operation is transmitted from the slave 1, the control unit 32 of the communication control device 3 recognizes that the voice circuit 13 of the slave 1 was closed. When the control unit 32 detects the control information from the slave 1, the control unit 32 mutes a speech transmission signal from the slave 1, thereby preventing that the control information is transmitted to the speech communication partner. The control unit 32 releases the muting operation after completion of the reception of the control information from the slave 1. In this case as well, a volume can be also reduced without completely muting the speech transmission signal. In the case where the slave 1 returns a reception acknowledge signal in response to the control information from the master 2, the control unit 32 mutes the speech transmission signal from the slave 1 for a time duration during which a return of such a reception acknowledge signal is presumed. That is, the muting operation of the speech transmission signal and the muting operation of the speech reception signal are executed at different times. After that, the control unit 32 of the communication control device 3 checks to see if the communication of the control information has been completed or not after the control information was transmitted by the slave 1 via the master 2 (S114). When the communication of the control information is not completed, the state in step S113 is continued.

After completion of the communication of the control information, the control unit 32 of the communication control device 3 transfers a voice circuit release notification to the slave 1 via the master 2 (S115). After the voice circuit release notification was received (S14), the control unit 12 of the slave 1 releases the voice circuit 13 (S16). Thus, a speech communication can be executed.

In the above description, as shown in step S11, the voice circuit has been closed due to the key operation of the slave 1. Explanation will now be made with respect to the operation in the case where before starting the communication of the control information from the communication control device 3 to the slave 1 via the master 2, a voice circuit close notification is transmitted from the communication control device 3 to the slave 1 via the master 2, thereby closing the voice circuit.

Figure 5:
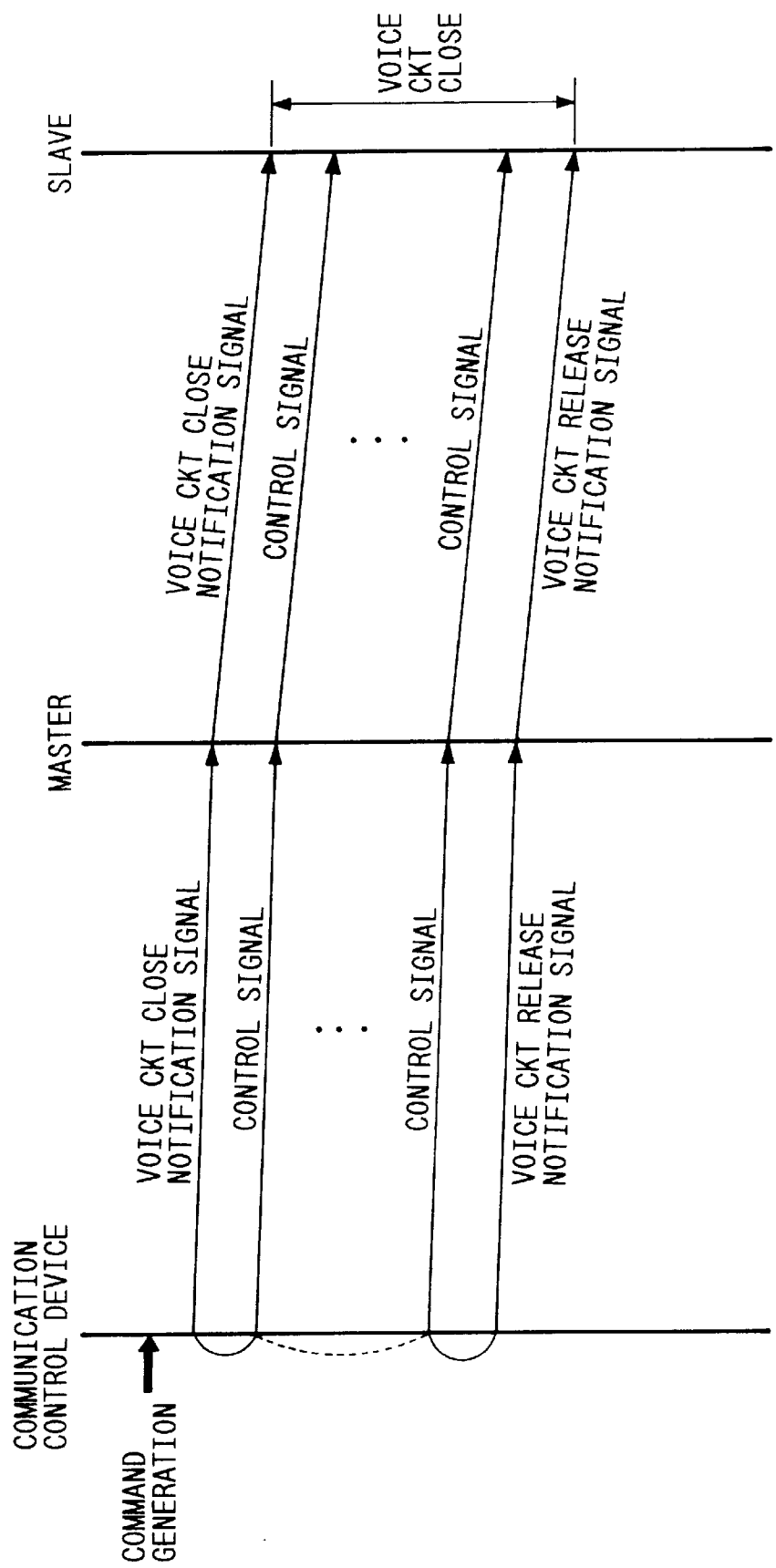
FIG. 5 is a sequence chart showing the second operation of the first embodiment.
Figure 6B:
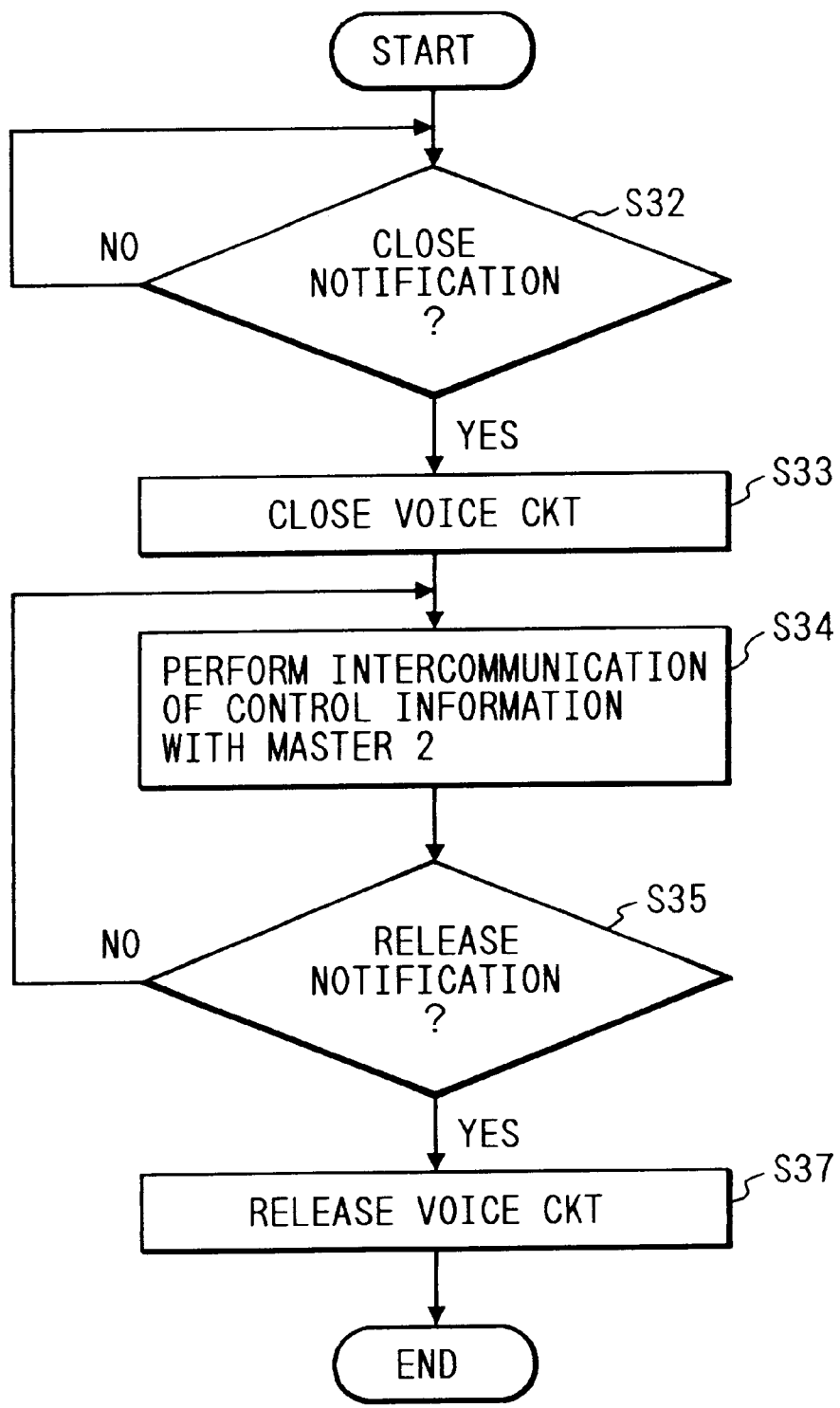

FIG. 5 is a sequence chart showing an example of the operation of the radio telephone system in such a case. FIGS. 6A and 6B are flowcharts showing an example of the operation of the communication control device 3 and slave 1 of the radio telephone system.

First, in the case where the control information is generated from the communication control device 3 to the slave 1 (S311), before such control information is transmitted, the control unit 32 of the communication control device 3 transmits the voice circuit close notification via the master 2 (S312). After receiving the voice circuit close notification (S32), the control unit 12 of the slave 1 closes the voice circuit 13 (on the speech reception side) (S33).

Subsequently, the control information is communicated between the slave 1 and the communication control device 3 via the master 2 (S34, S314). Just after the completion of the communication was confirmed (S315), the control unit 32 of the communication control device 3 transmits the voice circuit release notification via the master 2 (S316). By receiving the voice circuit release notification, the control unit 12 of the slave 1 opens the voice circuit 13 (S37). Thus, an uncomfortable sound which is caused due to the communication of the control information is avoided. In this case, an uncomfortable sound in the communication of the control information due to a command of the communication control device 3 can be avoided. The control unit 32 mutes the speech transmission signal in a time zone during which a return of a reception acknowledge signal from the slave 1 is presumed in a manner similar to the foregoing case.

FIG. 7 is a block diagram showing an example of the second radio telephone system embodying the invention. The system is constructed by the cordless slave (hereinafter, referred to as a slave) 1 serving as a radio slave and the radio master 2 connected to a wire circuit.

Figure 8:
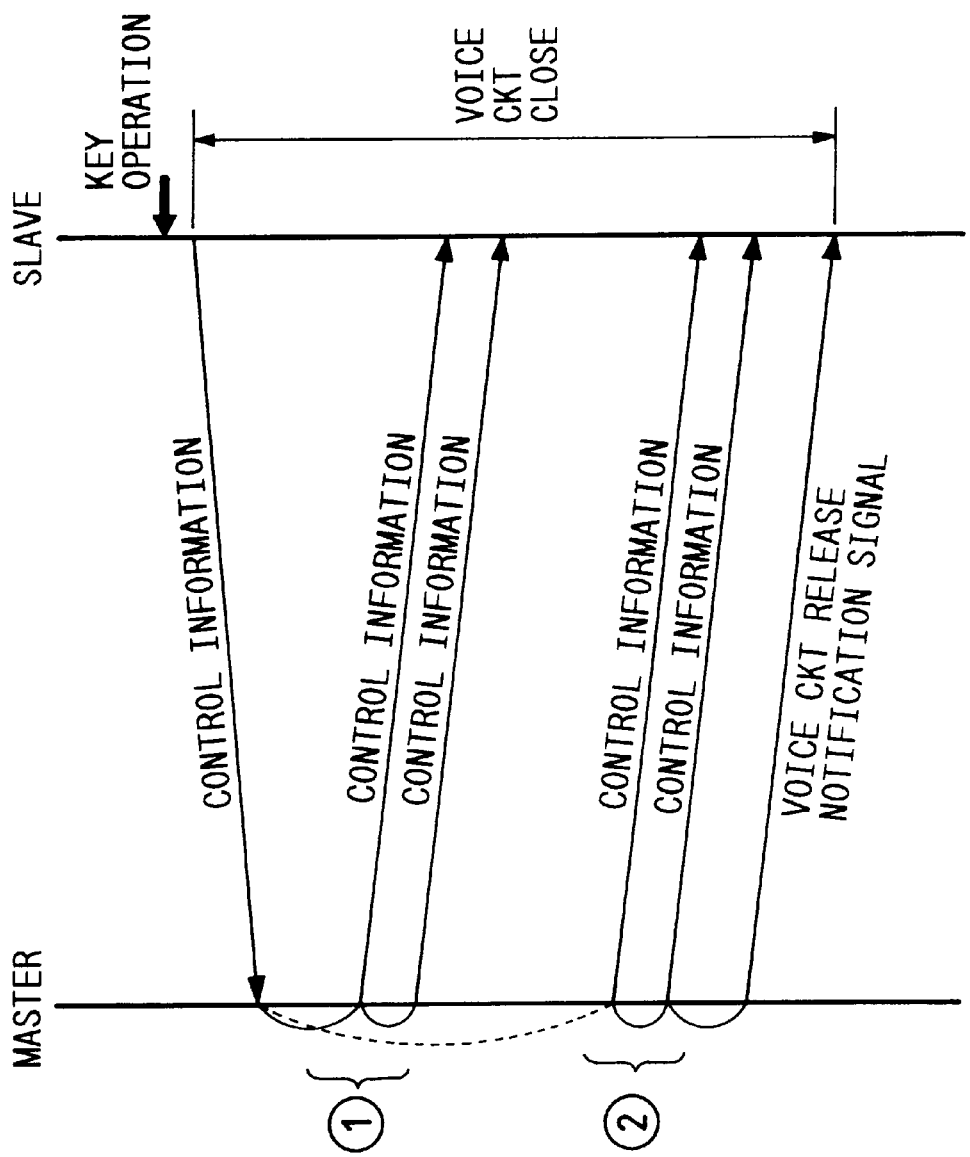
FIG. 8 is a sequence chart showing the operation of the third embodiment of the invention.
Figure 9A:
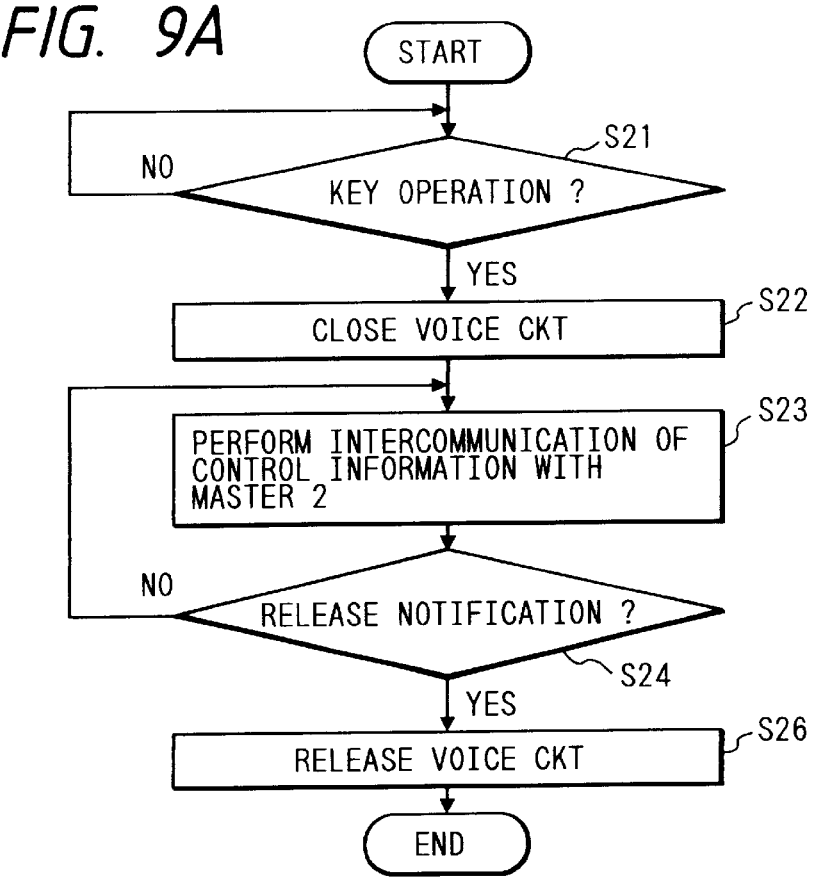
FIGS. 9A and 9B are flowcharts showing the operation of the third embodiment.
Figure 9B:
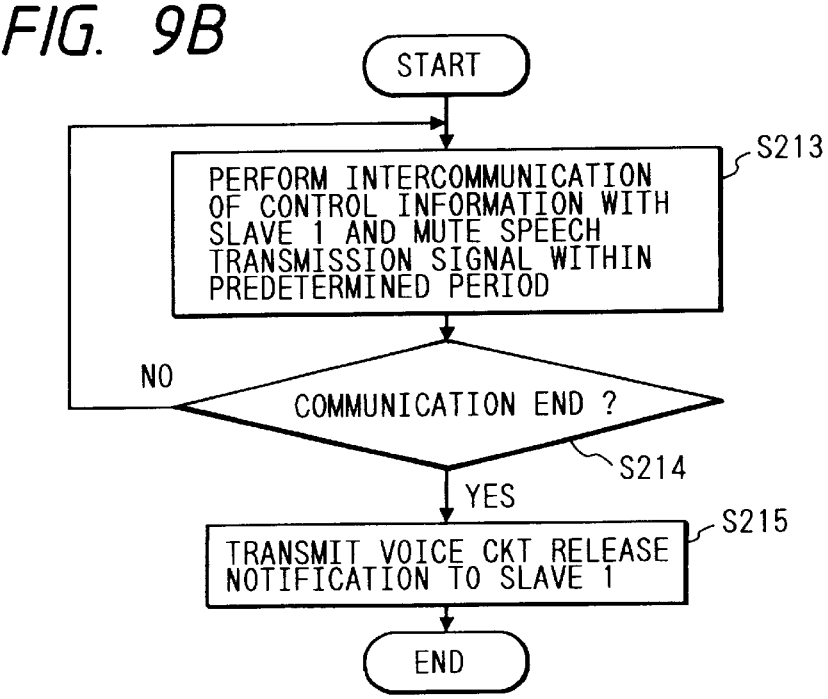

FIG. 8 is a sequence chart showing an example of the operation of the radio telephone system of the embodiment. FIGS. 9A and 9B are flowcharts showing an example of the operation of the slave 1 and a master 20 in the radio telephone system of the embodiment.

First, when a key operation such as a dial key or the like is performed in the console unit 14 of the slave 1 (S21), the control unit 12 closes the voice circuit 13 (on the speech reception side) of the slave 1 by using the key operation as a trigger (S22) in order to prevent the user from hearing an uncomfortable sound which is caused by the communication of the control information.

Subsequently, the control information is communicated between the slave 1 and the master 20. However, an uncomfortable sound which is caused by such a communication is not heard by the user (S23, S213). In this instance, since the control information in association with the key operation is transmitted from the slave 1, a control unit 24 of the master 20 recognizes that the voice circuit 13 of the slave 1 was closed. The control unit 24 mutes the speech transmission signal in a manner similar to the control unit 32 of the foregoing embodiment.

After that, the control unit 24 of the master 20 judges whether communication of the control information has been completed or not (S214). When communication of the control information is not completed, the state in step S213 is continued.

After completion of communication of the control information, the control unit 24 of the master 20 transfers a voice circuit release notification to the slave 1 (S215). When receiving the voice circuit release notification, the control unit 12 of the slave 1 releases the voice circuit 13 (S26).

Although the present invention has been described above with respect to the preferred embodiments, the invention is not limited to the constructions of the above embodiments but many modifications and variations are possible within the spirit and scope of the appended claims of the invention. For example, the invention is not limited to the radio telephone system but can be also applied to a wired communication system in which a speech communication signal and a control signal are communicated using a common channel.

What is claimed is:

1. A communication apparatus comprising:
   receiving means for receiving a communication signal;
   transmitting means for transmitting a control signal;
   audible output means for outputting an audible output in accordance with the communication signal; and
   limiting means for starting a limitation of the audible output according to a transmission of the control signal to another communication apparatus by said transmitting means and for stopping the limitation of the audible output according to a reception of a predetermined signal from said another communication apparatus by said receiving means.

2. An apparatus according to claim 1, wherein said limiting means has a key to request the transmission of the control signal and limits the output of the reception signal in accordance with an operation of said key.

3. An apparatus according to claim 1, wherein said limiting means releases the limitation of the output of the reception signal in response to the reception of the predetermined signal by said receiving means.

4. An apparatus according to claim 1, wherein said transmitting means and said receiving means transmit and receive radio signals.

5. A communication system including a master and a slave, wherein said slave comprises:
   receiving means for receiving a reception signal from said master;

transmitting means for transmitting a transmission signal including a control signal to said master;

audible output means for outputting an audible output in accordance with the reception signal; and limiting means for starting a limitation of the audible output according to a transmission of the control signal to said master by said transmitting means and for stopping the limitation of the audible output according to a reception of a predetermined signal from said master by said receiving means, wherein said master transmits the predetermined signal in response to the control signal.

6. A system according to claim 5, wherein said slave has a key to request the transmission of the control signal and said limiting means limits the output of the reception signal in response to an operation of said key.

7. A system according to claim 5, wherein said limiting means releases the limitation of the output of the reception signal in accordance with the reception of the predetermined signal by said receiving means.

8. A system according to claim 5, wherein said master and said slave transmit and receive radio signals.

9. A system according to claim 5, wherein said master limits an output of a signal from said slave in accordance with a control signal from said slave.

10. A system according to claim 9, wherein said master limits the output of the signal from said slave for a predetermined time.

11. A system according to claim 5, wherein said master transmits control information to said slave and limits a reception signal so as to mute a response from the salve for said control information.

12. A method of limiting an output of a received signal transmitted by a communication partner, comprising the steps of:

receiving a communication signal from the communication partner;

transmitting a control signal to the communication partner;

outputting an audible output from audible output means in accordance with the communication signal;

starting a limitation of the audible output according to a transmission of the control signal to the communication partner; and stopping the limitation of the audible output according to a reception of a predetermined signal from the communication partner.

13. A method according to claim 12, wherein the control signal is transmitted in accordance with an operation of a key to request the transmission of the control signal, and the output of the reception signal is limited in accordance with an operation of the key.

14. A method according to claim 12, wherein the limitation of the output of the reception signal is released in response to the reception of the predetermined signal by said receiving means.

15. A method according to claim 12, wherein radio signals are received and transmitted in said receiving and transmitting steps.

16. A method according to claim 12, wherein the output of the received signal is limited until reception of the predetermined signal which is in response to the control signal.

17. A method according to claim 12, wherein the control signal includes dialing information.

18. An apparatus according to claim 1, wherein the output of the received signal is limited until reception of the predetermined signal which is in response to the control signal.

19. An apparatus according to claim 1, wherein the control signal includes dialing information.

20. A system according to claim 5, wherein the output of the received signal is limited until reception of the predetermined signal which is in response to the control signal.

21. A system according to claim 5, wherein the control signal includes dialing information.

* * * * *

UNITED STATES PATENT AND TRADEMARK OFFICE
CERTIFICATE OF CORRECTION

PATENT NO.   : 6,055,416
DATED        : April 25, 2000
INVENTOR(S)  : Futoshi Hachimura Page 1 of 1

It is certified that error appears in the above-identified patent and that said Letters Patent is hereby corrected as shown below:

Column 1,
Line 17, please delete "speech when" and insert therefor -- speech. When --
Line 18, please insert -- , -- after terminal
Line 25, please insert -- , -- after bad
Line 26, please insert -- , -- after device
Line 35, please delete "communicated session during a communication." and insert therefor -- communicated during a communication session. --

Column 2,
Line 44, please insert -- , -- after communication
Line 50, please delete "execute the communication" and insert therefor -- execute communication --

Signed and Sealed this

Twenty-sixth Day of March, 2002

Attest:

JAMES E. ROGAN
Attesting Officer
Director of the United States Patent and Trademark Office